100 MICRONS

United States Patent Office

3,709,864
Patented Jan. 9, 1973

3,709,864
POLYURETHANES
Frederic Christian Loew, Ridgewood, Edward Stone, Morris Plains, and Frank Peter Civardi, Wayne, N.J., assignors to Inmont Corporation, New York, N.Y.
Continuation-in-part of applications Ser. No. 819,337, Apr. 25, 1969, and Ser. No. 1,277, Jan. 7, 1970. This application Apr. 3, 1970, Ser. No. 25,580
Int. Cl. C08g 51/44
U.S. Cl. 260—32.6 N                    19 Claims

ABSTRACT OF THE DISCLOSURE

Microporous leather substitutes are made from high molecular weight linear thermoplastic elastomeric polyurethanes of I.V. 0.9–2 which have been prepared by reaction in solution in dimethylformamide ("DMF") solvent which contains substantially no free tertiary amine. A monofunctional strong mineral acid is added to neutralize free tertiary amine groups. A hydroxyl-terminated prepolymer and a diol chain extender are reacted with a small excess of diisocyanate, until the —NCO content becomes constant, then a diol chain extender in amount equivalent to the remaining —NCO and reaction is continued, and then terminated with an alcohol after the high I.V. is attained.

---

Figure 1:
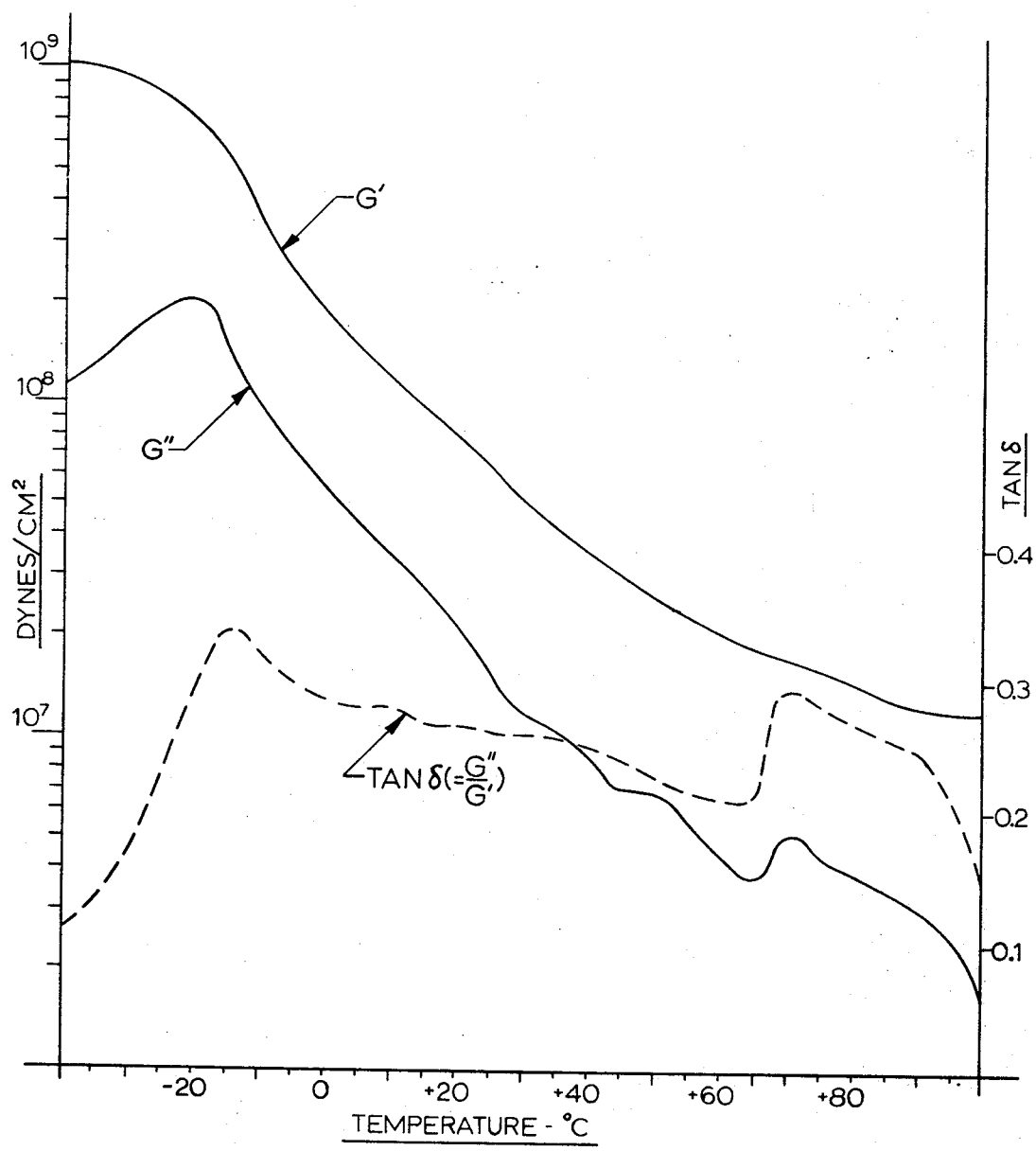

This application is a continuation-in-part of our copending application Ser. No. 819,337 filed Apr. 25, 1969, now abandoned, whose entire disclosure is incorporated herein by reference, and our copending application entitled "Polyurethanes" filed Jan. 7, 1970, Ser. No. 1,277, now abandoned.

The process for making a polyurethane solution, as described in said copending application, may be carried out over a wide range of temperatures. Preferably the reaction mixture is maintained at a temperature below 200° C., more preferably below the boiling temperature of the solvent at atmospheric pressure, e.g. below about 160° C., and above 30° C. It is preferred to operate at above 40° C.; reaction temperatures of about 50° C., 60° C., 70° C., 80° C. and 100° C. have given very good results. As one goes to the higher reaction temperatures the linearity of the polymer is maintained, without the cross-linking resulting from dimerization or trimerization which (according to the teachings of the prior art mentioned in the aforesaid Ser. No. 819,337) would be even more expected at such temperatures. The polymer solutions made at the higher temperatures have been found to have a somewhat lower solution viscosity (for a given polymer I.V. and concentration) and they yield very good microporous products when treated as described in Ser. No. 819,337. By using the higher temperatures it becomes more practical to use lower concentrations of catalyst e.g. dibutyltin dilaurate) or to use no added catalyst at all and also to reduce the reaction time.

The proportion of the monofunctional strong acid is at least about a stoichiometric amount; that is, enough to provide about one acid group for each tertiary amino nitrogen atom in the solution. For best results, an excess of the acid is used. Preferably, for the production of desirable high molecular weight products (e.g. of I.V. above 1.0, such as 1.1 and higher) of outstanding properties, the excess, over the stoichiometric amount, is not above about one gram mol of the acid in a million grams of DMF; that is the amount of acid is sufficient to neutralize all the tertiary amine in the DMF and, in addition, is sufficient to provide up to about one gram mol of acid per million grams of DMF. Most preferably the excess is less than 0.7 gram mol per million grams of DMF, e.g. an excess of 0.1, 0.2, 0.3 or 0.5 gram mol per million grams of DMF. Generally the excess is well below 2.6 gram mol per million grams of DMF.

The amount of added acid is, optimally, far less than that which would act as an effective chain terminator in the reaction. Generally the amount of excess acid is well below one millimol per mol of —NCO group added to the reaction mixture. Thus, in a typical reaction mixture using an excess of about 0.1 gram mol of toluenesulfonic acid per million grams of DMF, there are, based on the amounts of reactants supplied to the mixture, only about 0.07 millimol of excess p-toluenesulfonic acid per mol of —NCO groups (that is, about 0.14 millimol of excess acid per mol of diisocyanate) and similarly about 0.07 millimol of excess p-toluenesulfonic acid per mol of —OH groups. (Similarly proportions of 0.3, 0.5, 0.7 and 1.0 gram mol of excess acid represent, respectively, only about 0.2, 0.33, 0.43 and 0.7 millimol per mol of —NCO groups [or per mol of —OH groups].) Assuming, for the sake of illustration, that the final polymer has a molecular weight of 100,000, simple calculation will show that a typical polyurethane of this invention (having, say, a nitrogen content in the range of about 4 to 5%) will have some 280 to 360 urethane linkages (per polymer molecule of 100,000 molecular weight), each such urethane linkage linkage representing the reaction of one —OH group and one —NCO group. Thus, for a polyurethane of 100,000 molecular weight the amount of excess p-toluenesulfonic acid (0.07 millimol per mol of NCO) represents only about 0.02–0.25 molecule for each polymer molecule. While the foregoing discussion has been based, for convenience, on an assumed molecular weight of 100,000, actual measurements of the most preferred polyurethane solutions indicate that their molecular weights (determined by osmometry, for instance) are roughly in the range of about 40,000 to 140,000.

It is believed that the excess mineral acid (e.g. $RSO_3H$) may react with the DMF to form a dimethylformamidium compound, e.g. dimethylformamidium tosylate; this dimethylformamidium compound, or acid in equilibrium therewith, may react with the isocyanate to form groups such as

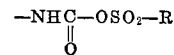

which may be labile and which may then be split, as by the action of the hydroxyl groups in the reaction mixture, thus regenerating the acid or dimethylformamidium compound for reaction with other isocyanate groups. It is possible that this may also play a part in helping to inhibit the isocyanate-DMF reaction described in the prior art. It is believed that all the excess acid present during the reaction becomes bound to the polymer (although it may be split off during later treatment with aqueous media).

By the use of an excess of acid, in the range of say 0.2 to 0.7 gram mol per million grams of DMF, we have produced new and highly useful solutions of polymers of high intrinsic viscosity. Despite their relatively high concentrations, these novel polyurethane solutions are ungelled and have good (and relatively stable) flow properties, as measured by their Brookfield viscosities. While not wishing to be bound by any particular theory, we believe that this may be due to a control of the branching and length of the polymer chains so that the tendency of polymer chains to entangle physically is reduced. In the solutions which we particularly prefer, the relationship between I.V. and Brookfield viscosity (V) and the polymer concentration (C) (expressed as percent of polymer in the solution, i.e.

$$C = \frac{\text{weight of polymer}}{\text{total weight of solution}} \times 100$$

is in the range expressed by the equation:

$$\frac{100 \log 10 \, V}{C} = 7(\text{I.V.}) + 3.3. \pm 0.7$$

The concentration of polymer in the solution is preferably in the range of about 25–35%, most preferably about 30–33%. The Brookfield viscosity, in poises, is that measured at 25° C., using spindle 5 or 6. Most preferably the I.V. is in the range of about 1.1 to 1.2.

While it is preferred to produce products of I.V. not above 1.4, it is within the broader scope of this invention to continue the reaction further to make products of higher I.V., say 1.6, 1.8 or 2.0, particularly when the reaction mixture is more dilute, e.g. when the concentration of the total reactants (and of the final polymer) is, say, 5%, 10%, 15%, 20% or 25%.

It will be understood that while it is most convenient to add the monofunctional acids as such, it is also within the scope of the invention to use compounds which form such acids in situ (as by reaction with traces of water present in the DMF), e.g. anhydrides such as p-toluenesulfonic anhydride or (less desirably) acid halides such as the acid chloride or bromide. Another acid, less preferred from the standpoint of the properties of the final solution, is hydrochloric acid.

The following examples are given to illustrate this invention more fully. In the examples all pressures are atmospheric unless otherwise indicated. In the application all proportions are by weight unless otherwise indicated.

EXAMPLE 1

To 2398 g. of N,N-dimethylformamide ("DMF") in a reactor are added (at room temperature) 531.5 g. Desmophen 2001 polyester (a hydroxyl-terminated polyester of 2000 molecular weight, having a hydroxyl number of about 55.5 mg. KOH per g., made from about 1 mol butane diol-1,5, 1.13 mol ethylene glycol and 2 mols adipic acid), 122.7 g. 1,4-butanediol, 0.048 g. p-toluenesulfonic acid monohydrate, 0.331 g. dibutyl tin dilaurate and 448 g. diphenylmethane-p-p′ diisocyanate. The solution is stirred and the unreacted isocyanate content determined by titration every 20 minutes. After the —NCO content has been stable for at least 20 minutes, an amount of 1,4-butanediol to provide one alcoholic hydroxyl for each unreacted isocyanate group is added. The viscosity of the solution increases over a total period of 3½ hours to 2000 poise (Brookfield, spindle 5 or 6, measured at 25° C.). Shortly thereafter, 0.1% (based on the total weight of the mixture) of butanediol-1,4 is added to stop the reaction; this butanediol is added as a 50/50 mixture with methanol. The final reaction mixture is discharged and cooled. The concentration of the final solution is 32.1% and its viscosity is 2760 poises (corresponding to a viscosity at 31.5% concentration of about 2400 poises); the final intrinsic viscosity is 1.130 (measured at 25° C.). During the process the temperature is kept at about 70° C.

Analysis of the DMF before the reaction shows that it contains a total amount of amine equivalent, in basicity, to 5.2 p.p.m. of dimethylamine; a total amount of acid equivalent, in acidity, to 20.8 p.p.m. of formic acid; and 0.03% of water. The amount of added sulfonic acid is such as to make the DMF distinctly acidic.

The process is carried out under substantially anhydrous conditions. The reactor is predried by flushing dry nitrogen through it at 80° C. and is then cooled under nitrogen to room temperature before the ingredients are charged thereto. The ingredients are added under a nitrogen blanket. The DMF is added first (after it has passed through a column of a molecular sieve for removal of traces of water); next the polyester, butanediol and catalyst are added in that order and the mixture is agitated for 15 minutes. The diisocyanate is then added while stirring and the reactor is sealed and the agitation is effected at a higher rate for the remainder of the reaction.

A microporous sheet having good strength and good water vapor permeability may be made as follows: 800 g. of the above polyurethane solution is mixed into 427 g. of micropulverized sodium chloride (average particle size 10 microns, maximum particle size 52 microns) contained in a one gallon, two-arm kneader. After being mixed for 65 minutes, the mixture is degassed at 4 mm. Hg for about 30 minutes, spread between 3.25 mm. shims onto a porous temporary support (e.g. a sintered polyethylene sheet treated with "Duponol ME" surfactant), immersed in 20° C. water for one hour, then overnight in 57° C. water, dried and removed from the temporary support. The microporous product is soluble in DMF and any scrap thereof may be mixed with freshly produced polyurethane and DMF and recycled to the process; thus, the scrap may be used to make more of the solution which is cast onto the temporary support to make a product having superior hydrolytic stability. In such recycling the ratio of recycled polyurethane to fresh polyurethane may be, for example, 2:1, 1:1 or 0.1:1. The water used for coagulating the case layer picks up DMF from that layer, forming a DMF-water mixture. The DMF is recovered from this mixture for reuse by distilling off the water.

EXAMPLE 2

Example 1 is repeated, except as follows: The initial reaction mixture contains 123.6 g. of the butanediol, .096 g. of the p-toluenesulfonic acid monohydrate and 0.222 g. of the dibutyltin dilaurate. Prior to the addition of the diisocyanate the mixture is at 65.5° C.; this temperature rises on such addition, reaching 88° in about 3 minutes and then declines reaching, some ten minutes later, a temperature in the range of about 80–82° C., which is maintained throughout the remainder of the run. Analyses for NCO content of the mixture (expressed in terms of percent of the amount of NCO originally added) are taken as follows: 58 minutes (after addition of diisocyanate) 5.25%; 63 minutes, 5.27%; 72 minutes, 5.12%; 99 minutes, 5.10%; 104 minutes, 5.04%. Thus, the —NCO content changes less than 0.1% between successive determinations and is substantially constant, from a practical point of view, with the very gradual drop in NCO content, considering the elevated reaction temperature and the experimental error, indicating that very little, if any, side reaction is occurring; to demonstrate this further, the mixture is held, at reaction temperature, until at 132 minutes (after addition of diisocyanate) the NCO is 4.91% of the amount of NCO originally added. At that time (132 minutes after addition of diisocyanate) there is added an amount of 1,4-butanediol stoichiometrically equivalent to this latter —NCO content, namely 7.94 g. butanediol. About 135 minutes after such addition, the reaction is terminated as in Example 1, by capping with butanediol -1,4. The final solution viscosity is 3110 poises (at 31.7% concentration, corresponding to a viscosity of about 3000 poises at 31.5% concentration) and the I.V. is 1.115. After 50 days of storage at room temperature there is very little drop in solution viscosity, the viscosity then being 2800 poises.

EXAMPLE 3

Example 1 is repeated, except as follows: The initial reaction mixture contains .096 g. of the p-toluenesulfonic acid monohydrate and 0.219 g. of the dibutyl tin dilaurate. Prior to the addition of the diisocyanate the mixture is at 81.7° C.; this temperature rises on such addition, reaching 104.5° C. in about 3 minutes and then declines, reaching, some 10 minutes later, a temperature of about 98° C. and being maintained at 98–99° C. until the addition of 7.4 g. of the 1,4-butanediol to exactly neutralize the measured excess —NCO) about 76 minutes after the addition of the isocyanate. Thereafter the temperature is maintained at 100° C. for another 135 minutes at which time the reaction is terminated as in Example 1, by capping with butanediol-1,4. The final solution viscosity is 2700 poises (at 31.6% concentration corresponding to a viscosity of about 2600 at 31.5% concentration) and the I.V. is 1.175. A measurement of solution viscosity made 50 days thereafter shows that the viscosity drops very little on storage at room temperature.

In the examples the initial mixing of the ingredients with the DMF prior to addition of the diisocyanate occurs within a relatively short time (e.g. less than a day and generally less than an hour prior to said addition) and the mixture is distinctly acidic prior to such addition.

The following material is taken from our previously mentioned parent copending application Ser. No. 819,337:

In accordance with one aspect of this invention a microporous material is prepared by a process in which a hydroxylterminated prepolymer dissolved in dimethylformamide ("DMF") is reacted with a diisocyanate and a diol to form a dissolved thermoplastic elastomeric polyurethane of intrinsic viscosity in the range of 0.9 to 1.4, the resulting solution is mixed with a microparticulate pore forming material and the mixture is formed into a thick layer and coagulated by incorporating water into the solution.

It has previously been proposed to react the hydroxyl-terminated prepolymer with diisocyanate and diol in molten condition and then dissolve the resulting product in the DMF, whereupon a further prepolymerization reaction takes place. By carrying out substantially the entire reaction in DMF, rather than merely the last stages, it has been found possible to obtain a highly soluble, high molecular weight product, with better control of the polymerization reaction (including control of such factors as reaction rate, viscosity, molecular weight, linearity of the polymer, solubility, and solids content), better reproducibility of the results (including the properties of the final microporous product) and improved quality control.

A preferred embodiment of the invention employs a novel multistage reaction method in which the proportions of the reactants supplied to the earlier stage, i.e. to the reaction of the hydroxyl-terminated linear prepolymer, diisocyanate and diol chain extender, are such that there is a small stoichiometric excess of isocyanate groups (an excess of less than 20 mol percent, e.g. 5 to 15 mol percent) and the reaction is continued, in the solvent, until the isocyanate content reaches a constant level, as shown by analysis of a sample of the reaction mixture (for instance by titration with a 0.01 N solution of n-dibutylamine in dry tetrahydrofuran). At this time there are substantially no unreacted hydroxyl groups in the reaction mixture. Then, in the later stage, an amount of diol chain extender sufficient to provide one alcoholic hydroxyl group for each unreacted isocyanate group, as determined by that analysis, is added: the ensuing reaction of the isocyanate and hydroxyl groups is continued at controlled temperature and the viscosity of the mixture is measured during this reaction until a viscosity corresponding to an intrinsic viscosity in the range of about 0.9 or 0.95 to 1.4 is reached. At this time an end capping reagent, such as an alcohol (e.g. methanol or butane diol) or other chain-terminating reactant is added to stop the reaction. This procedure provides a highly controllable way of producing a novel product of controlled, stable, very high molecular weight which is not further reactive with water or other isocyanate-reactive compounds under normal conditions and which does not gel on storage (e.g. storage of the solution at room temperature for many months).

The amount of diol chain extender supplied to the later stage is below 20 mol percent (e.g. in the range of about 5 to 15 mol percent) of the amount of chain extender present in the earlier stage.

A preferred embodiment of the invention provides for regulation of the linearity of the polymer. The prior art, such as Japanese patent 43–1880 published Jan. 23, 1968, points out that temperatures of below 40° C. and preferably below 30° C. should be used when an organic diisocyanate is reacted in DMF. According to that patent the diisocyanate dimerizes or trimerizes at higher temperatures and it is therefore absolutely essential that the operation should be carried out within the above-mentioned temperature range. British Pat. 1,104,174 published Feb. 21, 1968 teaches that diisocyanates polymerize in DMF stating that: "Exact investigations lead to the conclusion that during polymerization a trimerization primarily takes place with formation of isocyanuric acid rings. During further molecular growth, a system cross-linked in all directions and consisting of isocyanuric acid units linked together is formed which the dialkyl formamide enters into a solution or a molecular bond." We have discovered that this reaction of the diisocyanate with, or in the presence of, the DMF is due to the fact that the DMF commonly contains minute amounts of tertiary amines, e.g. 1, 5, 10, 15 or 20 p.p.m. of trimethylamine and bisdimethylaminomethane. We have also discovered that the dimerization and trimerization reactions may be suppressed even at temperatures above 40° C. (e.g. 50° C.) by using DMF which contains substantially no free tertiary amine. We have found that the effect of the teriary amine can be overcome by carrying out the reaction in the presence of a monosulfonic acid in an amount of at least about one sulfonic acid group per tertiary amino nitrogen. The action of the monosulfonic acid may be to form a salt with the tertiary amine so that substantially no free tertiary amine is present. It is also within the broader scope of the invention to use a DMF whose tertiary amine content has been reduced by other methods, e.g. by certain distillation techniques. Thus, it is within the broader scope of the invention to use, without the added monosulfonic acid, a DMF containing less than 5 gram atoms of tertiary amino nitrogen per $10^9$ grams of DMF.

In a particularly preferred form of the invention, the reaction of the diisocyanate and the hydroxyl-containing compounds in DMF is carried out in the presence of a catalyst for the reaction of —NCO an alcoholic —OH which does not promote dimerization or trimerization of —NCO in DMF. Particularly suitable catalysts are stannous salts of carboxylic acids such as stannous octoate and covalently bonded tin compounds such as dibutyltin dilaurate. These are known catalysts for isocyanate-hydroxyl reactions; see "Polyurethanes Chemistry and Technology Part I. Chemistry" by Saunders and Frisch published 1962 by Interscience Publishers p. 168 Table XXX items B and C for compounds of this type. It is found that in the presence of such catalysts the complete reaction can be carried out in DMF which contains substantialy no free tertiary amines (the latter having been neutralized by the previously mentioned sulfonic acid, for instance) at a temperature of say 50° C. in a period of only a few hours. Thus an I.V. of about 1 has been reached in about 8 hours or less (the solution thus obtained being non-gelled and capable of being stored for long times without gelling) and the complete reaction of the diisocyanate and the hydroxyl compounds originally present (i.e. the reaction's early stage, previously described) has occurred in less than 4 hours (e.g. 2 hours) in the practice of this invention. In contrast, the previously mentioned Japanese patent requires over 51 hours at 30° C. to obtain a much lower molecular weight polymer even though it uses a ratio of —NCO to —OH which is much higher than that employed in our early stage and which would therefore be expected (by the law of mass action) to make for a much faster reaction rate.

A preferred monosulfonic acid is an arylmonosulfonic acid, such as p-toluene sulfonic acid. Other such acids are benzene sulfonic acid and xylene sulfonic acid. Aliphatic sulfonic acids, such as methanesulfonic acid and ethane sulfonic acid can also be used and it is within the broader scope of the invention to use other monofunctional strong monofunctional mineral acids, e.g. monofunctional monophosphonic acids. In contrast, the substitution of certain other strong acids such as phosphoric acid in place of the arylmonosulfonic acid actually promotes gelation, while the substitution of a strong difunctional acid such as sulfuric acid has been found to give a non-gelled product of a less desirable type, one which is less stable against hydrolysis. Monofunctional carboxylic acids, such as formic acid, has not been found to give the same effect; on the contrary, formic acid acts as a chain terminator.

The proportion of the monofunctional strong acid is, as stated, at least about a stoichiometric amount; that is, enough to provide about one acid group for tertiary amino nitrogen atom in the solution. An excess of the acid may be used; for instance an excess, over the stoichiometric amount, of as much as about 100 p.p.m. of p-toluene sulfonic acid has been used (that is, an amount of the acid sufficient to neutralize all the tertiary amine in the DMF plus 100 parts of the acid, by weight, per million parts of DMF), and the use of an excess of about 20 to 30 p.p.m. may be desirable. The amount of the excess is generally well below 500 p.p.m.

While the use of the monofunctional strong acid has shown its greatest value in the preferred embodiment in which substantially the whole reaction is carried out in DMF, it is also within the broader scope of the invention to employ such an acid in the known process in which the diisocyanate, hydroxylterminated prepolymer and chain extender are first reacted in the melt (i.e. in the substantial absence of solvent) and the product is then added to DMF so that further reaction occurs. Here too the presence of the monofunctional strong acid will serve to neutralize the effects of the tertiary amine in the DMF and thus inhibit the dimerization and trimerization reaction which would otherwise take place.

The DMF may be analyzed for its content of impurities by vapor phase chromatography. One such analysis of a DMF showed that it contained 0.34 p.p.m. trimethylamine, 0.18 p.p.m. dimethylamine, 0.61 p.p.m. methanol and 0.75 p.p.m. bis(dimethylamino) methane. The equivalent amounts of toluenesulfonic acid needed for neutralization of the tertiary amine content is about 3½ p.p.m.; about 1 p.p.m. for the trimethylamine and about 2½ p.p.m. for the bis(dimethylamino) methane.

The hydroxyl-terminated prepolymer preferably has a molecular weight below 6000 and more preferably between 800 and 2500; a molecular weight of 1800–2200 is particularly preferred. It may be a polyester of a hydroxycarboxylic acid (e.g. a polycaprolactone) or a polyester of a glycol and a dicarboxylic acid (e.g. ethylene glycol adipate or 1,4-butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester are 1,6-hexanediol and 1,8-octanediol. The most useful polyesters are aliphatic polyesters in which the

groups are separated by aliphatic chains averaging about 3 to 6 carbon atoms in length. A prepolymer which provides flexible or "soft" segments in the polyurethane molecule is preferred.

The hydroxyl-terminated prepolymer may be a polyether. Typical polyethers which are used to provide the soft segments for elastomeric polyurethanes are usually of aliphatic character. One type has the formula $H(RO)_nH$ where R is a divalent alkylene radical, such as tetramethylene or ethylene or propylene, and $n$ denotes the degree of polymerization.

The preferred diisocyanate is diphenyl methane -p,p'-diisocyanate, but other diisocyanates may be used as such or in admixture therewith. Examples of other diisocyanates are 2,4-toluene diisocyanate, p,p'-diphenyl diisocyanates and tetramethylene diisocyanate. The most suitable diisocyanates have molecular weights below 500.

The chain extender is preferably a low molecular weight glycol. A particularly preferred chain extender is tetramethylene glycol. Others are ethlyene glycol, diethylene glycol, hexamethylene glycol or octamethylene glycol. Both hydroxyl groups of the glycol are preferably primary hydroxyls, and the glycol is preferably unbranched (having no branches such as dependent methyl or ethyl groups).

In the preferred class of polyester polyurethanes made with diphenylmethane-p,p'-diisocyanate, those having nitrogen contents in the range of 4 to 5%, most preferably in the neighborhood of 4½%, (e.g. 4.4–4.6%) have been found to be particularly suitable.

A particularly suitable polyurethane is made from a polyester prepolymer of at least 1500 molecular weight, the proportions of aromatic diisocyanate, polyester and chain extender being such that the high molecular weight polyurethane is insoluble in 10% concentration in tetrahydrofuran at room temperature.

A preferred catalyst for use in the reaction is dibutyltin dilaurate. As previously indicated this is a well known catalyst for the isocyanate-hydroxyl reaction. It is acidic in nature and, as shown by Saunders and Frisch (previously cited) gives a high rate of reaction in a solvent-free system at 70° C. as indicated by a relatively short gelation time.

The proportion of catalyst present in the reaction mixture may be, for instance, within the range of about 0.001 to 1% (preferably about 0.01 to 0.05%) based on the total weight of the reactants.

The concentration of the reactants in the DMF is preferably such as to produce a polyurethane concentration in the range of about 15 to 40 or 45%, more preferably about 30 to 35%. The proportion of hydroxyl-terminated prepolymer is preferably in the range of about 40 to 60%, more preferably about 50% (e.g. 48–52%), of the total weight of the polyurethane, and the proportion of the diisocyanate is preferably in the range of about 35 to 45%, more preferably about 40% (e.g. 38–42%) of the total weight of the polyurethane. The proportion of diisocyanate added to the initial mixture of prepolymer and such chain extender as may be present initially is preferably sufficient to supply about 1.01 to 1.2 isocyanate groups per hydroxyl group in the initial mixture.

The reaction is preferably carried out without substantial addition or removal of dimethylformamide.

During the reaction, the reaction mixture is preferably maintained at a temperature below 70° C. more preferably below 60° C. and above 30° C. as indicated previously. It is most preferred to operate at above 40° C.; a reaction temperature of about 50° C. has given very good results.

The solutions produced in accordance with this invention are especially useful for the production of shoe upper material whose base is a microporous sheet consisting essentially of elastomeric polyurethane material. Unlike conventional leather substitutes which have ultimate elongations of some 20–40%, these sheets do not have their extensibility constrained by the presence of a reinforcing fabric (such as a woven or non-woven fibrous fabric) and can be stretched well over 50% (e.g. well over 100% and usually well over 200%). In a preferred form of the invention the solution of the high molecular weight elastomeric polyurethane, produced as described above, is mixed with finely divided pore-forming microscopic particulate material (preferably microscopic sodium chloride particles) the mixture is shaped into sheet form and treated so as to add water to the shaped mixture so as to coagulate the polyurethane (which although soluble in DMF is insoluble in a DMF-water mixture containing some 12% water). The coagulated sheet is then treated to remove all the pore-forming particles, e.g. by leaching with hot water, to dissolve out all the salt.

In the preferred embodiment, as indicated previously, the reaction mixture consists essentially of bifunctional reactants and the dimerization and trimerization reactions are controlled so as to avoid cross-linking. Our results so far indicate that essentially linear polymers produce a particularly suitable microporous shoe leather substitute and that the preferred essentially linear polymers have their glass transition temperatures (measured, for instance, by differential thermal analysis) below 0° C. e.g. at −25° C. at the same time that they display a relatively high modulus of elasticity (in tensile testing).

In one embodiment of the invention a controlled degree of polymer chain branching is produced, while cross-linking and gelation is avoided, by including in the reaction mixture a quantity of monofunctional reagent (e.g. methanol, dimethylamine, or formic acid) and an equivalent amount of a polyfunctional reagent (e.g. a trifluctional alcohol such as trimethylolpropane, trimethylolethane or glycerol) so that the net functionality of these monofunctional and polyfunctional reagents is 2.00 or less. Thus, when the sole polyfunctional reagent is the trifunctional trimethylolpropane, no more than one mole of that compound is present per mol of monofunctional reagent. The amount of polyfunctional reagent is relatively small and may be expressed in terms of the number of reactive groups in excess of two (hereafter called its "over-two-reactive groups") provided by the polyfunctional reagent. Obviously one molecule of trimethylolpropane has one "over-two-reactive group" and one molecule of pentaerythritol has two "over-two-reactive groups." The amount of polyfunctional reagent is usually such as to provide well below 3 (e.g. in the range of 0.1 to 2) gram equivalents of "over-two-reactive groups" per 100,000 grams of the reactants (and, since substantially the entire quantity of the reactants is converted to polymer, less than 3 gram equivalents of "over-two-reactive groups" per 100,000 grams of polymer). In two typical products made by us the amount of polyfunctional reactant (trimethylolpropane) is (a) about 1 gram mol and (b) about ⅕ gram mol per 100,000 grams of reactants; since trimethylolpropane has one "over-two-reactive group" these provide, correspondingly, (a) about 1 and (b) about ⅕ gram equivalent of "over-two-reactive group" in excess of two per 100,000 grams of product. (In these two examples the ratio of the molar amount of added monofunctional reactant (methanol, other than that added as a chain terminator at the end of the reaction) to the molar amount of trimethylolpropane is (a) about 1:1 and (b) about 1.05:1.) It follows that in case (a), if the average molecular weight of the product is assumed to be 100,000, there will be an average of about 1 branch (supplied by the presence of the trimethylolpropane) per polymer molecule, while in case (b) only about a fifth of the polymer molecules will have such a branch. If the average molecular weight of the polymer is assumed to be 50,000 only about half of the polymer molecules will have such a branch, in case (a). Thus, despite the presence of the polyfunctional component, the materials have substantially no chemical cross links and are believed to derive their properties from hydrogen bonding forces rather than cross linkages. Their stress-strain curves are of the same general shape as those shown in FIG. 1 of the article by Stetz and Smith in Rubber Age, May 1965 p. 74.

The introduction of branches in the manner described above has yielded polymer solutions which can be allowed to stand for a considerable time before use and which will still produce microporous sheets (on coagulation with water) that have very nearly the same physical properties as those made from the fresh solution. In contrast similar aging of the more truly linear polymer solutions (unless specially treated) has a much greater effect on the physical properties of the microporous sheets made therefrom.

In addition the solutions of the slightly branched polymers appear to yield a microporous sheet of desirably higher density. The reason for this is not understood but it may be related to an increased sensitivity to coagulation on the incorporation of small amounts of water.

As previously described, a chain extender is added after the isocyanate content has reached a constant level, (which indicates that the mixture contains substantially no unreacted hydroxyl groups). Best results have thus far been obtained by using a dihydric alcohol as the chain extender at this stage. It is within the broader scope of this invention, however, to employ other difunctional chain extenders at this stage, either alone or in admixture (e.g. in 1:1 molar ratio) with the diol. Examples of such materials are diamines, e.g. p,p'-diaminodiphenylmethane and aminoalcohols, e.g. aminoethanol.

The amount of chain terminator which is added after the reaction mixture has attained the desired molecular weight (as indicated, for instance. by the viscosity of the solution) is not narrowly critical. It should of course be at least sufficient to react with all the remaining —NCO groups but an excess (e.g. a 5% excess) may be used to make sure that the reaction is terminated effectively.

It is also within the broader scope of the invention to use other liquid amides as the solvents in place of, or in admixture with, the DMF. Examples of other amides are N,N-dimethylacetamide and N-methyl pyrrolidone.

Figure 2:
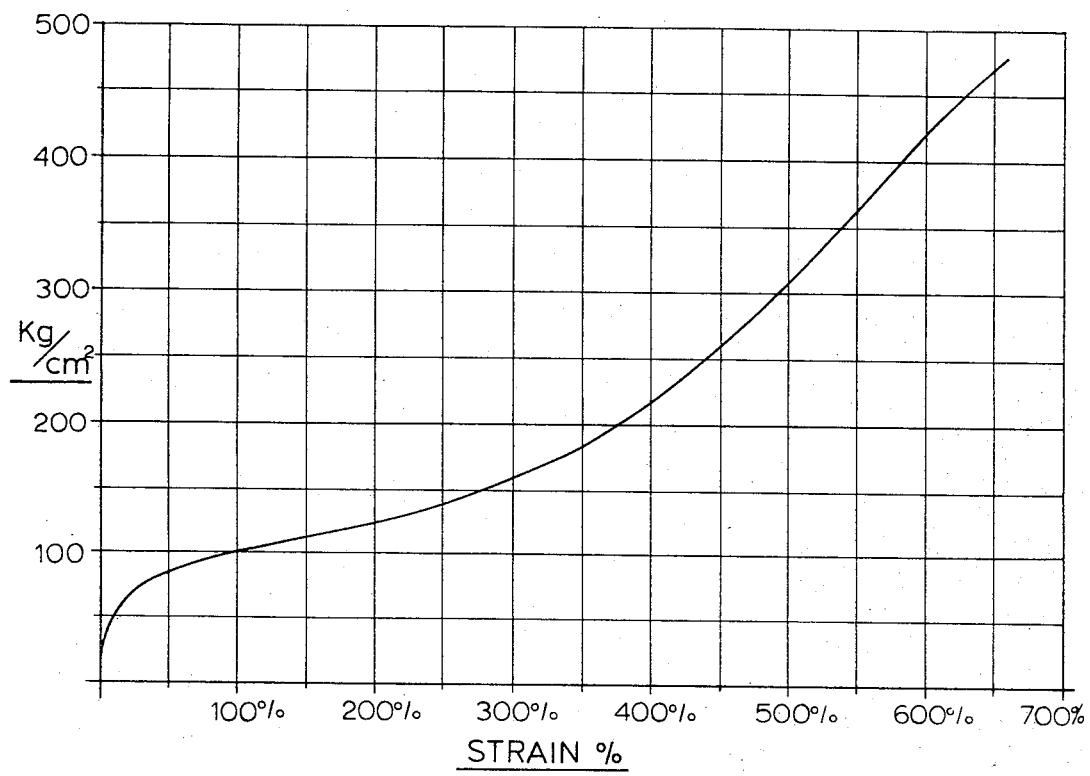
Figure 3:
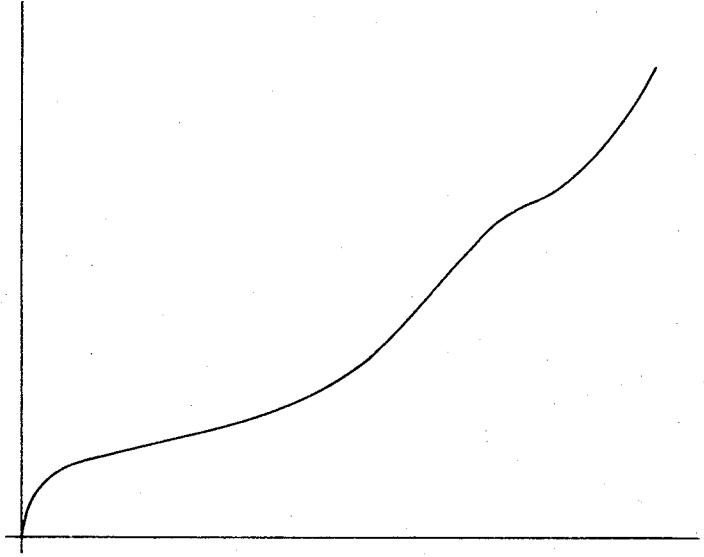
Figure 4:
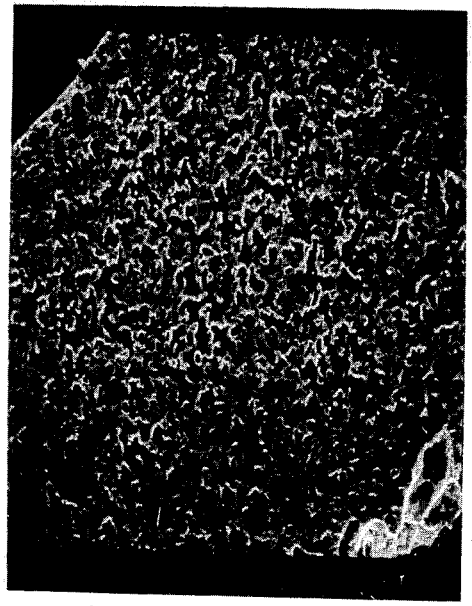

In the accompanying drawings,

FIG. 1 is a modulus-temperature plat for a microporous sheet made from a preferred essentially linear polyurethane, produced in accordance with this invention, FIG. 2 shows stress-strain plot for a non-porous film made from another preferred essentially linear polyurethane produced in accordance with this invention, FIG. 3 shows stress-strain plot for a cross-linked polyurethane, and FIG. 4 is a photomicrograph of a cross-section of a typical microporous sheet produced as described herein.

In FIG. 1 the three curves are for the dynamic shear modulus (G'), the loss modulus (G") and the loss factor (tan δ). The peak in the loss factor corresponds to the glass transition temperature of the polyurethane, which as shown in the graph, is at about −20° C. (e.g. in the range of −10 to −30° C.). The values of G', G" and tan δ can be determined, for example by the use of a torsion pendulum as described by Nielsen "Mechanical Properties of Polymers" (Reinhold Pub. Corp. 1962) Chapter 7 "Dynamic Mechanical Testing." The low glass transition temperature has been found to correspond to a high flex life of the product (as determined, for example, by the number of cycles of flexing that can be made before the material shows outfold cracks during cold flex testing according to ASTM D-2097 on a Newark Leather Finish Co. flex testing machine operated in an atmosphere at 0° C. or −12° C.). Also to be noted is the relatively sharp peak of the tan δ curve (in the 60–80° C. range), which is believed to indicate the hydrogen bonding, and also the absence of pronounced peaks between the two principal peaks. The particular microporous sheet on which the data plotted in FIG. 1 was obtained was about 1.6 mm. thick and had a density of 0.46 g./cm.³., a water-vapor permeability of about 120% of that of good calf leather and an elongation at break of 332%; the method of making the sheet was similar to that disclosed in Example 1 (i.e. mixing a polyurethane solution in DMF with micropulverized salt, casting a sheet of the mixture, coagulating it with water and leaching it with water, and then drying). In the torsion pendulum test rectangular samples (about ⅜″ x 2½″) of the microporous sheet were used.

In each of FIGS. 2 and 3 the stress-strain plot was determined on a smooth void-free thin film; for example a film 0.2–0.4 mm. thick made by carefully casting a degassed solution of the polyurethane in DMF and then carefully evaporating off the solvent in a dry atmosphere. The stress-strain test was carried out on an Instron tester (model TM). It will be noted that the curve in FIG. 2 shows two points of inflection ("yield points"). In contrast the corresponding stress strain curve for a cross-linked polyurethane (in this case made from the same reactants but in the presence of 10 p.p.m. NaOH in addition to the tin-containing catalyst) shows three points of inflection.

The photomicrograph, FIG. 4, was obtained with a scanning type electron microscope (Type JSM, Japan Electron Optics Laboratory Co., Ltd.), viewing a cross-section of the sheet material (obtained by cutting perpendicularly through the thickness of the sheet with a razor). In preparation for viewing the cut sheet material is given a very thin uniform metallic coating (for example a gold-palladium coating about 300 angstroms in thickness which may be applied by evaporating the metal onto the specimen in a high vacuum, e.g., $10^{-4}$ mm. Hg absolute, the specimen being rocked while metal deposition is occurring, so as to distribute the metal uniformly over the surface, including the crevices, of the specimen). This coating serves to conduct away the electron charge which would otherwise accumulate on the surface of the specimen when its is exposed to the electron beam in the scanning electron microscope. The approximate scale is indicated on the photomicrograph. In viewing the photomicrograph it should be borne in mind that the scanning type electron microscope has a great depth of focus enabling one to, in effect, see into the interiors of the pores.

The following examples are given to illustrate this invention more fully. In the examples all pressures are atmospheric unless otherwise indicated. In the applications all proportions are by weight unless otherwise indicated.

EXAMPLE 1A

To 20.7 kg. of N,N-dimethylformamide ("DMF") in a 10 gal. reactor are added (at room temperature) 4423.8 g. Desmophen 2001 polyester (a hydroxyl-terminated polyester of 2000 molecular weight, having a hydroxyl number of about 55.5 mg. KOH per g., made from about 1 mol butanediol-1,5, 1.12 mol ethylene glycol and 2 mols adipic acid), 900.61 g. 1,4-butanediol, 0.5148 g. methanol, 2.154 g. trimethylolpropane, 0.04127 g. p-toluenesulfonic acid, 3.536 g. dibutyl tin dilaurate and 3514.42 g. diphenylmethane-p-p′-diisocyanate. The solution is stirred and the unreacted isocyanate content determined by titration every ½ hour. At the end of 2½ hours, the —NCO content having been stable for at least ½ hour, an amount of 1,4-butanediol (74.82 g.) to provide one alcoholic hydroxyl for each unreacted isocyanate group is added. The viscosity of the solution increases over a 6 hour period to 2450 poise (Brookfield, spindle 5 or 6, measured at 25° C.) at which point 160 g. of a 40/60 w./w. methanol/DMF solution is added to stop the reaction. 60 minutes later the reaction mixture is discharged and cooled. The final solution viscosity is 2100 poise; the final intrinsic viscosity is 1.115. During the process the exothermic reaction is moderated by cooling, so that the temperature is kept at about 50° C.

Analysis of the DMF before the reaction shows that it contains a total amount of amine equivalent, in basicity, to 3.8 p.p.m. of dimethylamine; a total amount of acid equivalent, in acidity, to 5.8 p.p.m. of formic acid; and 0.04% of water. The amount of added sulfonic acid is such as to make the DMF distinctly acidic.

The process is carried out under substantially anhydrous conditions. The reactor is predried by flushing dry nitrogen through it at 80° C. and is then cooled under nitrogen to room temperature before the ingredients are charged thereto. The ingredient are added under a nitrogen blanket. The DMF is added first, after it has passed through a column of a molecular sieve for removal of traces of water; next the polyester, butanediol and catalyst are added in that order and the mixture is agitated for 15 minutes. The diisocyanate is then added while stirring and the reactor is sealed and the agitation is effected at a higher rate for the remainder of the reaction.

800 g. of the above polyurethane solution is mixed into 427 g. of micropulverized sodium chloride (average particle size 10 microns, maximum particle size 52 microns) contained in a one gallon, two-arm kneader. After being mixed for 65 minutes, the mixture is degassed at 4 mm. Hg for about 30 minutes, spread between 3.25 mm. shims onto a porous temporary support (a sintered polyethylene sheet treated with "Duponol ME" surfactant), immersed in 20° C. water for one hour, then overnight in 57° C. water, dried and removed from the temporary support.

The resulting sheet is 1.9 mm. thick and has a density of 0.40 g./cm.³, a water vapor transmission of 720/g./m.²/24 hrs. and a slit tear strength of 3.4 kg.

The microporous product is soluble in DMF and any scrap thereof may be mixed with freshly produced polyurethane and DMF and recycled to the process; thus, the scrap may be used to make more of the solution which is cast onto the temporary support. In such recycling the ratio of recycled polyurethane to fresh polyurethane may be, for example, 2:1, 1:1 or 0.1:1.

The water used for coagulating the cast layer picks up DMF from that layer forming a DMF-water mixture. The DMF is recovered from this mixture for reuse by distilling off the water.

EXAMPLE 2A

Example 1A is repeated without using a polyfunctional reactant such as trimethylolpropane. The amounts used are as follows: 770 parts DMF, 205 parts polyester, 46.5 parts butanediol (in the initial mixture) 0.01846 part p-toluenesulfonic acid, 0.1616 part dibutyltin dilurate, 171.6 parts diphenylmethane-p,p′-diisocyanate. The NCO:OH molar ratio in the charge is about 1.1:1. The amount of diol added after the —NCO content becomes stable is about 3–5 parts (that is, in a series of eight successive runs under substantially the same conditions the amounts added, as determined from the NCO analysis, are 4.183, 3.063, 4.85, 4.631, 5.055, 4.939, 4.473 and 4.903 parts, respectively). The amount of the methanol/DMF mixture (50/50 w./w.) added as a chain terminator is 7.5 parts. The final polymer contains 4.50% nitrogen and has an I.V. of 1.075; its polymer-solvent interaction parameter (K′ in the Huggins equation) is 0.519. The solution has a total nonvolatile content of 31.4% and a viscosity of 2400 poises.

In this example the —NCO content is measured after ¾ and 1½ hours of reaction and is found to be unchanged, whereupon the 3–5 parts of diol is added. After another 5½ hours of reaction the chain terminator is added.

Analysis of the DMF, before raction, by vapor phase chromatography shows that it contains 0.34 p.p.m. trimethylamine, 0.18 p.p.m. dimethylamine, 0.61 p.p.m. methanol and 0.75 p.p.m. bis(dimethylamino) methane.

EXAMPLES 3A

Example 1A is repeated, using the following amounts of materials: 600 parts DMF, 130 parts polyester, 28.38 parts butanediol, 0.1022 parts dibutyl tin dilaurate, 0.006 parts p-toluenesulfonic acid, 0.0875 parts methanol (in the initial mixture), 0.350 parts trimethylolpropane, 108.8 part of the diisocyanate. The NCO:OH molar ratio in the charge is about 1.14:1. The amount of diol added after the —NCO content becomes stable is about 3½ part, that is in a series of four successive runs under substantially the same conditions the amounts added, as determined from the NCO analysis, are 3.67, 3.45, 3.30 and 3.50 parts, respectively. The amount of the methanol/DMF mixture (50%50 w./w.) added as a chain terminator is 5 parts. The final polymer contains 4.50% nitrogen and has an I.V. of 1.030; its polymer-solvent interaction parameter ($K^1$ in the Huggins equation) is 0.471. The solution has a total nonvolatile content of 31.4% and a viscosity of 2500 poises.

In this example the —NCO content is measured after 1½ and 2 hours of reaction and is found to be unchanged, whereupon the 3½ parts of diol is added. After another 5½ hours of reaction the chain terminator is added.

Analysis of the DMF, before reaction, by vapor phase chromatography shows that it contains 0.03 p.p.m. trimethylamine, 7.8 p.p.m. bis(dimethylamino) methane and 0.08 p.p.m. By titration it is found to contain an amount of acid equivalent to 7.8 p.p.m. of formic acid and an amount of base equivalent to 6.2 p.p.m. dimethylamine.

The intrinsic viscosity is determined in highly dilute solution in analytical grade DMF which has been thoroughly dried by storage under a nitrogen atmosphere over a molecular sieve (Linde 5A). Four measurements at 250° C. corresponding to four, approximately equally spaced, concentrations are made on intrinsic viscosity and polymer-solvent interaction parameter are determined by the Huggins equation:

$$\frac{\eta_{sp}}{C} = [\eta] + K^1 [\eta]^2 C$$

where $\eta_{sp}$ is the specific viscosity and C is consentration expressed in g./100 ml., and $[\eta]$ is the intrinsic viscosity.

For use in making shoe upper materials the preferred polyurethanes have melting points of at least 100° C. preferably above 150° C. (e.g. about 170 to 200° C., as measured by differential thermal analysis or differential scanning calorimetry). When formed into a smooth voidfree thin film 0.2–0.4 mm. in thickness they have the properties described below: a tensile strength of at least 210 kilograms per square centimeter (preferably at least 350, e.g. about 420 to 560), a percent elongation at break of at least 300% (preferably at least 400%, e.g. about 500 to 700%), an elastic modulus of at least 105 kilograms per square centimeter (preferably at least 350 e.g. about 560 to 770), a 100% secant modulus (stress divided by strain at 100% elongation) of at least 28 kilograms per square centimeter (preferably at least 84, e.g. about 110 to 134). These mechanical properties are measured by ASTM D882–67.

The preferred polyurethane (again, tested as a thin film made as described above) recovers completely from a 5% elongation at room temperature (23° C.) but preferably does take on a permanent set (one measured for example as in an ASTM D412–66) after a 100% elongation. This set is usually within the range of about 5 to 20%, as in the range of about 10 to 20%, e.g. about 15%. The "permanent set" is usually measured an hour after the release of stress; for example, a material which shows a tension set of some 24–26% immediately on release of the clamps after being held at the 100% elongation for 10 minutes will have a tension set of 14% measured 1 hour after the release of the clamps. (In the measurement a film specimen 1 cm. wide with a gage length of 5 cm. and is strained to the 100% elongation at a range of 254% per minute.)

Preferably the material has a Shore hardness of at least 75A (more preferably about 90A to 60D), measured by ASTM D1706–67.

As indicated, the preferred technique for making the microporous shoe upper sheet material is by casting a thick layer of a suspension of microscopic salt particles in the DMF solution of the polyurethane, coagulating the solution and leaching out the salt. The thickness of the coagulated sheet, after leaching and drying is at least 25 mils (0.63 mm.), e.g. about 30 to 100 mils (about 0.75 to 2.5 mm.) and preferably about 30 to 70 mils (about 0.75 to 1.8 mm.). Other techniques may be employed. Thus other coagulating methods may be used to treat the thick layer of the mixture of polyurethane solution and leachable material. Among such coagulating methods are cooling the mixture, (e.g. —78° C.), or subjecting the mixture to vapors of non-solvent (e.g. to a humid atmosphere), or simply evaporating the solvent, preferably at a rate slow enough to avoid the formation of macroporous bubbles or holes in the sheet, or using various combinations of these coagulating methods (e.g. freeze drying techniques) before removal of the leachable material (e.g. NaCl) or other microscopic particulate material. In place of, or together with, the salt particles, other pore-forming microscopic particulate material may be used. These particulate materials may be starch particles (which may be removed by treating the coagulated layer with an aqueous starch-digesting agent, such as an enzyme, of known type). Or they may be other microscopic solid particles which are insoluble in the polyurethane solution and which can either be dissolved out by treating the coagulated sheet with water or other suitable solvent for the particle which is a non-solvent for the polyurethane or can be otherwise destroyed or removed; examples of such particles are sodium carbonate, oxalic acid, ammonium carbonate, or suitable microballoons. Alternatively, the voidforming particulate material may be in the form of dispersed microscopic droplets of a liquid insoluble in the solution of polyurethane or in the form of dispersed microscopic bubbles of gas. The particle size of the microscopic particulate material is well below 100 microns, preferably less than 50 microns and greater than about one micron, more preferably in the range of about 3 to 20 microns. The ratio of the total volume of the microscopic particulate void forming material and the total volume of polyurethane in solution may be, for instance, in the range of about 0.5:1 to 5:1, preferably in the range of about 1:1 to 3:1, thus 178 grams of the sodium chloride particles may be mixed with 333 grams of a 30% solution of the polyurethane in dimethylformamide, giving a volumetric salt:polymer ratio of 1:1.

The microporous sheet material (preferably after some surface finishing treatment) may be used in the manufacture of shoes in the same way as conventional shoe upper leather or upper leather substitutes. Thus in making shoes it is customary to cut the upper leather, usually with a die by machine, and to fit and assemble the parts of the upper together (including any doubler or lining that is to be used) as by stitching and/or cementing so as to ready the upper for lasting. After the insole has been secured to the bottom of the last, the upper is placed on the last, pulled over the wooden last so as to conform tightly to it, and attached to the insole. This "pulling over" is generally effected by mechanisms which grip, and pull, the upper at its edges, e.g. at the toe and sides.

During the fitting together of the upper, the edges of the upper leather are generally "skived," by cutting a bevel on the "fleshside" of the leather adjacent its edge and the skived edge is then cemented, folded back on itself and pressed in place, to give a neat finished top line or other edge.

Descriptions of the conventional methods for making shoes are contained in the 61 page publication "How American Shoes Are Made" 3rd edition, copyright 1966 by United Shoe Machinery Corporation.

Excellent shoes have been made with materials produced in accordance with this invention in place of the usual upper leather. The upper not only conforms unusually well to the last, without wrinkling or puckering, but also retains its lasted shape very well after removal from the last, particularly when the upper has been given the conventional type of heat setting treatment (e.g. setting with heat along or moist heat) on the last. The material has very good skiving characteristics, particularly if it is wet with water prior to skiving. The shoes are comfortable and the uppers show very good wear resistance. Unlike many shoes made with the conventional fabric-reinforced leather substitutes, there is no problem of fabric show-through or orange peel on lasting.

The "microporous" materials used in the process of this invention have pores invisible to the naked eye of a person with 20/20 vision. Such pores measure less than 100 microns in their maximum dimension (when a plane surface, such as the top or bottom of the material or a cross-section thereof is observed). As will be seen from FIG. 4, the pores generally measure well below 50 microns in their maximum dimension.

The microporous sheet preferably has an apparent density in the range of about 0.25 to 0.7 grams/cm.$^3$, more preferably in the range of about 0.35 to 0.5 grams/cm.$^3$. Typically the density of the polyurethane itself is about 1.2; it will therefore be apparent that in the neighborhood of ¼ to ½ of the volume of the microporous material is air. The sheet preferably has a percent elongation at break of above 50% (e.g. in the range of about 300 to 400% or more); a tensile strength above 35 kg./cm.$^2$ (e.g. in the range of about 60 to 100); an elastic modulus above 2 kg./cm.$^2$ (e.g. in the range of about 4 to 9), and a notch tear strength above 2 (e.g. in the range of 3 to 5) kg. per mm. of thickness. It should permit the passage of water vapor; thus its water vapor transmission should be at least 200 g./m.$^2$/24 hrs. (measured as in ASTM E 96–66, procedure B). Also, it is desirable that at least the upper surface of the sheet, after suitable finishing, be resistant to the passage of liquid water, e.g. the finished sheet should have a hydrostatic head (British Standard 2823) of above 100 mm. Hg. While the polyurethane itself usually shows a tension set below 100%, as previously discussed, the preferred microporous polyurethane sheets generally recover completely with substantially no permanent set (under standard dry conditions at room temperature) after being stretched 100%.

All measurements referred to herein are made at room temperature (e.g. 23° C.) unless the test method specifies otherwise.

It is within the broader scope of the invention to carry out the multistage reaction scheme, described herein, in solvents other than DMF, and to apply it to reaction mixtures which consist essentially of difunctional reactants and contain other reactants in addition to the diisocyanate, hydroxyl-terminated prepolymer and diol, such as compounds having other isocyanate-reactive active-hydrogen-containing groups. It is also within the broader scope of the invention to apply our discovery of the advantages of the use of DMF of low free tertiary amine content (such as DMF whose free tertiary amine content has been neutralized by strong monofunctional mineral acid) in the formation of polyurethanes from dihydroxy compounds and diisocyanates, generally, using dihydroxy compounds and diisocyanates known to those skilled in the art. It is also within the broader scope of our invention to apply our discovery of the advantages of controlled chain branching in solution (as described previously) to polyurethane-forming reactions carried out in solvents other than DMF.

It is understood that the foregoing detailed description is given merely by way of illustration and that variations may be made therein without departing from the spirit of the invention.

We claim:
1. In the process for the production of polyester polyurethanes by reaction of reactants consisting essentially of a diisocyanate and a polyester having a plurality of carboxylic ester groups and two terminal alcoholic hydroxyl groups to produce a soluble thermoplastic polyester polyurethane, wherein the improvement comprises effecting said reaction in solution in a liquid amide solvent containing a tertiary amine impurity in the presence of a strong, monofunctional sulfonic acid, the amount of said acid being at least sufficient to provide one sulfonic acid group per tertiary amino nitrogen and up to an excess, over said sufficient amount, of about 100 parts per million parts of said amide, and the amount of said acid being sufficient to prevent gelation during the process, and continuing the polyurethane-forming reaction in solution in said amide until the intrinsic viscosity of the resulting dissolved polyurethane is in the range of 0.9 to 2 (measured in N,N-dimethylformamide at 25° C.), said liquid amide solvent being selected from the group consisting of N,N - dimethylformamide, N,N - dimethylacetamide and N-methyl pyrrolidone, said reaction mixture being maintained in liquid condition throughout said reaction.

2. Process as in claim 1 in which the proportions of the reactants are such that their net functionality is at most 2.00 and the reaction is continued until the intrinsic viscosity of the dissolved polyurethane produced by the reaction is in the range of 0.9 to 1.4.

3. Process as in claim 2 in which said reactants are reacted at a temperature above 40° C. and below 200° C.

4. Process as in claim 3 in which the temperature is below about 160° C.

5. Process as in claim 4 in which said reactants are reacted in solution in dimethylformamide.

6. Process as in claim 5 in which said acid is p-toluene sulfonic acid.

7. Process as in claim 6 in which the temperature is about 60 to 100° C.

8. Process as in claim 6 in which said temperature is about 50 to 70° C.

9. Process as in claim 8 in which the concentration of tertiary amine in said dimethylformamide is in the range of 1 to 20 p.p.m.

10. Process as in claim 1 in which said reaction is effected in the presence of a catalyst for the reaction of isocyanate groups and alcoholic hydroxyl groups which catalyst is a stannous salt of a carboxylic acid or a covalently bonded tin compound.

11. Process as in claim 1 in which the concentration of said polyester in the initial reaction mixture is at least 6%.

12. Process as in claim 11 in which the said liquid amide is dimethylformamide and the concentration of polyurethane in said liquid amide is in the range of about 30 to 35%.

13. Process as in claim 1 in which said polyester is a polyester of a hydroxycarboxylic acid or a polyester of a glycol and a dicarboxylic acid, said polyester having its —COO-groups separated by aliphatic chains averaging about 3 to 6 carbon atoms in length, the proportion of polyester being about 40 to 60% of the total weight of the polyurethane, and said liquid amide is dimethylformamide.

14. Process as in claim 13 which comprises reacting a mixture of said polyester, which has a molecular weight of 800 to 2500, a diisocyanate having a molecular weight below 500 and a diol having up to 8 carbon atoms in the dimethylformamide containing said sulfonic acid and a catalyst, said mixture consisting essentially of difunctional reactants, the isocyanate groups in said reaction mixture being present in the proportion of about 1.01 to 1.2 isocyanate group per active hydrogen-containing isocyanate-reactive group, continuing said reaction until substantially all said active hydrogen-containing groups have reacted, as evidenced by a substantially constant isocyanate content on analysis, adding to the reaction mixture a difunctional reagent having two isocyanate-reactive active hydrogen-containing groups in an amount equal stoichiometrically to said analytically determined substantially constant isocyanate content, and continuing the reaction in solution until the intrinsic viscosity of the dissolved polymer is in the range of 0.9 to 1.4 (measured in dimethylformamide at 25° C.) and terminating the reaction by adding an isocyanate-reactive end capping reagent in amount at least sufficient to react with all the remaining —NCO groups, the proportions being such that the amount of said added difunctional reagent is below 20 mol percent of the amount of said diol, said added difunctional reagent having up to 13 carbon atoms and being a diol, diamine or amine diol, and the concentration of the reactants, and the resulting polyurethane, in the solvent being in the range of about 30 to 35%, said catalyst being a catalyst for the reaction of isocyanate groups and alcoholic hydroxyl groups which catalyst is a stannous salt of a carboxylic acid or a covalently bonded tin compound.

15. Process as in claim 14 in which said added difunctional reagent is a glycol, said diisocyanate is aromatic, and said proportion of isocyanate group per active hydrogen containing isocyanate-reactive group is 1.05 to 1.15.

16. Process as in claim 15 in which the diisocyanate is diphenylmethane-p,p'-diisocyanate, said polyester is polycaprolactone or butanediol adipate and said catalyst is dibutyltindilaurate.

17. A process as in claim 1 in which said polyester is a polyester of a hydroxycarboxylic acid or a polyester of a glycol and a dicarboxylic acid, said polyester having its —OCOO-groups separated by aliphatic chains averaging about 3 to 6 carbon atoms in length, the proportion of polyester being about 40 to 60% of the total weight of the polyurethane, said liquid amide is dimethylformamide, and said reaction is continued to produce a solution in which the relationship between intrinsic viscosity ("I.V.") of the polyurethane and Brookfield Viscosity ("V," in poises) of the solution and polymer concentration ("C" in percent) is in the range expressed $$\frac{100 \log V}{C} = 7 (I.V.) + 3.3. \pm 0.7$$

18. Process as in claim 17 in which the concentration of polymer in the solution is about 25–35% and the I.V. is 0.9 to 1.4.

19. Process as in claim 18 in which the I.V. is about 1.1 to 1.2 and the concentration is about 30–33%.

References Cited

UNITED STATES PATENTS

| | | | |
|---|---|---|---|
| 3,446,771 | 5/1969 | Matsubayashi | 260—32.6 N |
| 3,097,192 | 7/1963 | Schilit | 260—32.6 N |
| 2,929,800 | 3/1960 | Hill | 260—32.6 N |
| 2,692,873 | 10/1954 | Langerak | 260—77.5 AB |
| 3,428,611 | 2/1969 | Brotherton | 260—32.6 N |
| 3,483,167 | 12/1969 | Sommer | 260—75 |

MORRIS LIEBMAN, Primary Examiner

P. R. MICHL, Assistant Examiner

U.S. Cl. X.R.

260—30.2